US012128767B2

(12) United States Patent
Lerzer et al.

(10) Patent No.: US 12,128,767 B2
(45) Date of Patent: Oct. 29, 2024

(54) METHOD FOR OPERATING A TOUCH-SENSITIVE INPUT UNIT, AND INPUT UNIT AND MOTOR VEHICLE

(71) Applicant: Audi AG, Ingolstadt (DE)

(72) Inventors: Jürgen Lerzer, Neumarkt (DE); Markus Klein, Pförring (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/251,032

(22) PCT Filed: Oct. 26, 2021

(86) PCT No.: PCT/EP2021/079593
§ 371 (c)(1),
(2) Date: Jul. 7, 2023

(87) PCT Pub. No.: WO2022/090179
PCT Pub. Date: May 5, 2022

(65) Prior Publication Data
US 2023/0382226 A1    Nov. 30, 2023

(30) Foreign Application Priority Data
Oct. 29, 2020    (DE) .................... 10 2020 128 419.5

(51) Int. Cl.
*B60K 35/00*    (2024.01)
*B60K 35/10*    (2024.01)
(Continued)

(52) U.S. Cl.
CPC .............. *B60K 35/00* (2013.01); *B60K 35/10* (2024.01); *G06F 21/31* (2013.01); *G06F 21/44* (2013.01);
(Continued)

(58) Field of Classification Search
CPC ...... B60K 35/00; B60K 35/104; B60K 35/28; B60K 2360/164; B60K 2360/1438; G06F 21/31; G06F 21/04
(Continued)

(56) References Cited

U.S. PATENT DOCUMENTS 9,582,318 B2    2/2017    Schroepf et al.
11,531,788 B2    12/2022    Klein et al.
(Continued)

FOREIGN PATENT DOCUMENTS

DE    102012223641 A1    6/2014
DE    102018206541 A1    10/2019
(Continued)

OTHER PUBLICATIONS

International Preliminary Report on Patentability directed to related International Application No. PCT/EP2021/079593, mailed on May 2, 2023, with attached English-language translation; 14 pages.
(Continued)

*Primary Examiner* — Kwin Xie
(74) *Attorney, Agent, or Firm* — Sterne, Kessler, Goldstein & Fox P.L.L.C.

(57) ABSTRACT

The present disclosure relates to a method for operating a touch-sensitive input unit of an operating device of a motor vehicle. A touch-sensitive control unit controls whether a protection session for encrypting or signing user inputs for respective applications should be activated by switching to the protection session if a message of a composition circuit confirms that the graphic user interface of the respective application is displayed in the foreground of a display and that the touch-sensitive control unit has received an activation message from the respective application.

12 Claims, 3 Drawing Sheets

(51) Int. Cl.
*B60K 35/28* (2024.01)
*G06F 21/31* (2013.01)
*G06F 21/44* (2013.01)

(52) U.S. Cl.
CPC ...... *B60K 35/28* (2024.01); *B60K 2360/1438* (2024.01); *B60K 2360/164* (2024.01)

(58) Field of Classification Search
USPC .................................................. 345/173–174
See application file for complete search history.

(56) References Cited

U.S. PATENT DOCUMENTS

| | | | |
|---|---|---|---|
| 2003/0233489 A1 | 12/2003 | Blaser et al. | |
| 2013/0141395 A1* | 6/2013 | Holmgren | G06F 3/04883 345/175 |
| 2014/0309806 A1* | 10/2014 | Ricci | H04W 48/04 701/1 |
| 2015/0304303 A1* | 10/2015 | Thibadeau, Sr. ... | G06F 3/04886 715/765 |
| 2016/0350548 A1* | 12/2016 | Lewis | G06F 3/04842 |
| 2019/0135199 A1* | 5/2019 | Galan Garcia | B60K 35/00 |
| 2020/0162836 A1* | 5/2020 | Beaurepaire | G06F 16/9537 |

FOREIGN PATENT DOCUMENTS

| | | | |
|---|---|---|---|
| EP | 2650164 | A1 | 10/2013 |
| EP | 2869181 | A1 | 5/2015 |
| WO | WO 2019/004659 | A1 | 1/2019 |

OTHER PUBLICATIONS

International Search Report of the International Searching Authority directed to related International Patent Application No. PCT/EP2021/079593, mailed Jan. 21, 2022, with attached English-language translation; 5 pages.

McCune, J. M. et al., "Safe Passage for Passwords and Other Sensitive Data," CyLab/Carnegie Mellon University, AMD, Jun. 4, 2018; 20 pages.

Sangorrín, D. et al., "Reliable Device Sharing Mechanisms for Dual-OS Embedded Trusted Computing," Proceedings of the 5th International Conference, TRUST 2012, Vienna, Austria, Jun. 2012. LNCS 7344, 2012; pp. 74-91.

Sharma, Chandra et al., "Review of the Security of Backward-Compatible Automotive Inter-ECU Communication," IEEE Access. DOI: 10.1109/ACCESS.2021.3104854, Aug. 24, 2021; 16 pages.

Vasudevan, A. et al., "Lockdown: Towards a Safe and Practical Architecture for Security Applications on Commodity Platforms," Proceedings of the 5th International Conference, TRUST 2012, Vienna, Austria, Jun. 2012. LNCS 7344, 2012; pp. 34-54.

* cited by examiner

METHOD FOR OPERATING A TOUCH-SENSITIVE INPUT UNIT, AND INPUT UNIT AND MOTOR VEHICLE

TECHNICAL FIELD

The present disclosure relates to a method for operating a touch-sensitive input unit, via which applications on a computer system of a motor vehicle are controlled by means of a touch input. The present disclosure also relates to an operating device, which can be operated according to the method, as well as to a motor vehicle with such an operating device.

BACKGROUND

In a motor vehicle, there are multiple possibilities of controlling the cockpit or infotainment system. One of these operating possibilities is a touch input, which can be input via a touchscreen (touch display) or via a touchpad, to access applications of the infotainment system. The touch input can be performed with an input object, for example a finger and/or a stylus.

The touch input can be transferred as a message from the input unit via a bus connection to the infotainment system or generally to a computer system, which executes the applications. The bus connection can for example be realized by means of a CAN bus system.

An application can be realized by software. The applications can for example be a navigation and/or communication and/or connectivity and/or a telematics service and/or a social medium and/or an email program and/or an examination of the availability of parking spaces and/or payments and/or streaming of video and audio.

The touch input can be described by coordinates on a touch-sensitive display, which are here referred to as touch coordinates. By means of the touch input, a touchpad (icon or button or menu entry) or a cursor can be operated. However, some touch inputs allow conclusions about secret data or data to be protected. Such a touch input to be protected can e.g. be a password and/or PIN input for an access to a secured function, e.g. payments.

The same input unit can also be used by other, external applications, which are not a constituent of the software by the manufacturer, but e.g. have been installed in the infotainment system by a user afterwards, or which even run in another control device, which can also be connected to the bus connection. In such a case, the touch input can be prone to any manipulation by attacks of the external applications, wherefore applications on the propriety computer system possibly require a safety function or a mechanism for the protection of the touch input, just like e.g. the PIN input. Now, if one would globally encrypt the entire data traffic on the bus connection, however, the retrofit of external applications and control devices would be considerably more difficult because they could not decrypt the bus data and thereby could not be controlled by means of a touch input.

From DE 10 2018 206 541 A1, a touch-sensitive, extensive input device is known. The input device is connected to a control device via a message-based bus connection and communicates messages describing touch events to the control device, which evaluates them to input information for an application program implemented by means of the control device.

From U.S. Pat. No. 2,003,233 489 A1, a computer system with a layered program structure for the employment in unsecure environments is known. The computer program comprises multiple application layers separated from each other, which can be separately encrypted to process data in encrypted manner as needed.

BRIEF DESCRIPTION OF DRAWINGS/FIGURES

DETAILED DESCRIPTION

Figure 1:
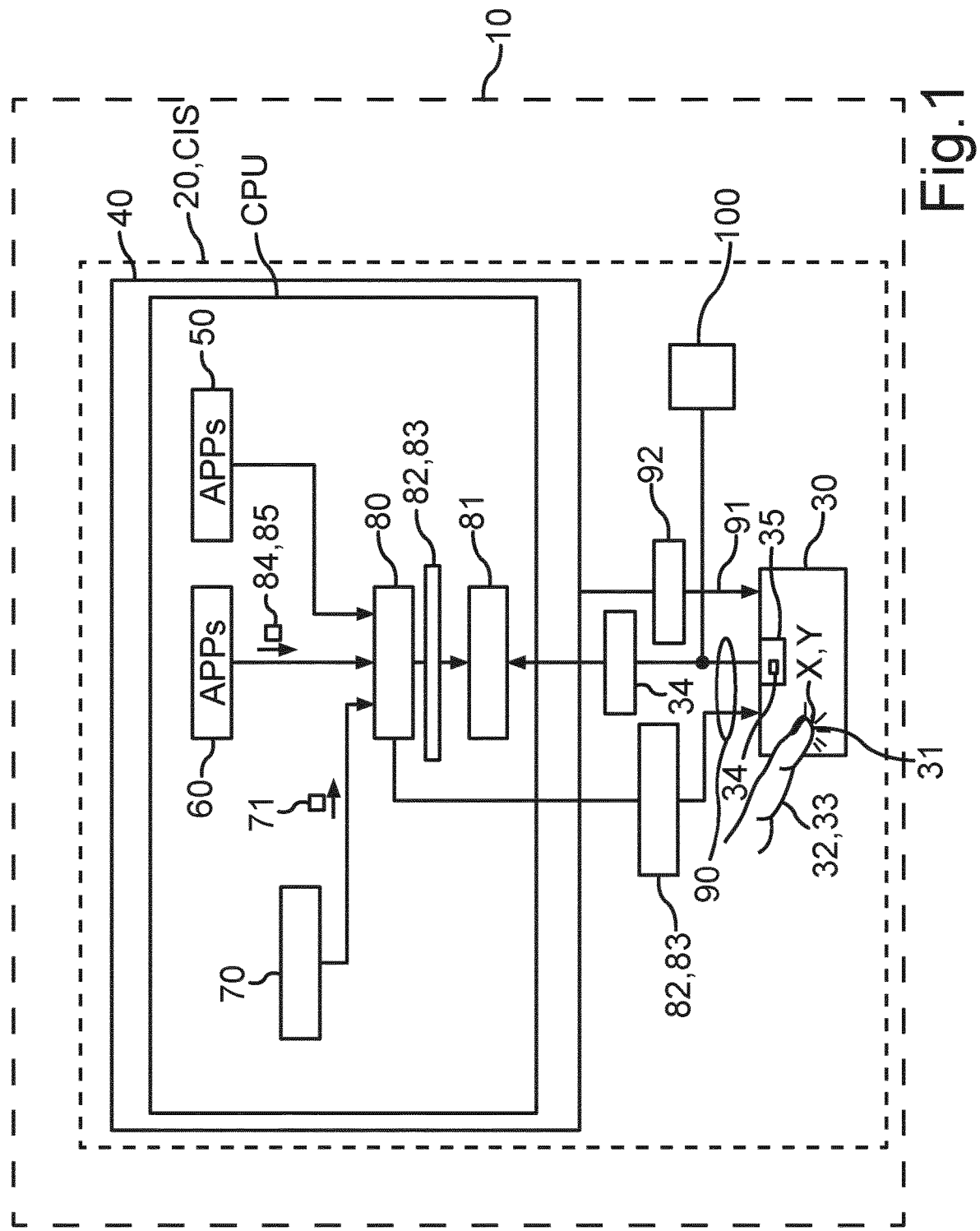
FIG. 1 illustrates an embodiment of the method according to the present disclosure.

The present disclosure is based on the object to protect a touch input, which is input by a user on a touch-sensitive input unit, from manipulation and/or unauthorized reading along upon transfer to a computer system, without herein blocking the additional use of the input unit by other control devices not capable of encryption.

The object is solved by the subject matters of the independent claims. Advantageous embodiments are described by the dependent claims, the following description as well as the figures.

By the present disclosure, a method is provided to operate a touch-sensitive input unit of an operating device of a motor vehicle. Applications on a computer system of the motor vehicle are controlled via the input unit by means of a respective touch input of a user. The input unit can be a touchscreen (display with touch sensor technology) or a touchpad (without display), wherein a display can be provided by a separate display (e.g. screen or head-up display) in the last case. The input unit can be connected to the computer system via the said bus connection or generally a communication link for transferring touch data, which describes the touch input. The computer system can e.g. provide the said infotainment system of the motor vehicle. The respective application can e.g. request the user to input authentication data to gain access to the respective application, whereupon the user can respond with the user input. The authentication data can for example represent a user name and/or a password and/or a PIN number. These are examples for touch inputs to be protected, which are to be protected upon transfer from the input unit to the computer system, because another control device could also be connected to the input unit via the communication link and could read along. In contrast, a touch input for enlarging a map section e.g. does not have to be protected.

In order to determine, which of the applications is currently displayed for the user in the foreground of the display, to receive the touch input, a composition circuit in the computer system manages a respective graphical user interface (GUI) of the applications on the touch-sensitive input unit or the separate display. The composition circuit can for example include a software program and/or a graphics board of the computer system. The user interfaces can be completely or partially graphically superimposed, which can be controlled by the composition circuit in a manner known per se, e.g. by means of a so-called window manager. The "foreground" of the display can finally be the portion of the user interfaces visible to the user. A change between the user interfaces can be effected by selecting the associated application (e.g. by tapping on the user interface thereof or by means of an operating menu or a mechanical operating element). The respective application, which is selected by a user, can be displayed opened in the foreground by the composition circuit. Then, it can also correspondingly be determined as a recipient for the touch inputs. For this assignment, a touch control unit communicates with the applications and/or the composition circuit in the computer system. The touch control unit can be coupled to the composition circuit and cause to be informed by it, which application or applications are currently displayed in the foreground, thus visible to the user and reachable for a touch input, by the composition circuit.

If a touch input is then transferred from the touch-sensitive input unit e.g. via the said communication link (e.g. the bus connection) to the computer system, thus, the touch control unit can forward this touch input to the selected application.

Now, the touch control unit can additionally determine that the touch-sensitive input unit transfers the data of the touch input (e.g. the touch coordinates) in protected manner if it is a touch input to be protected. Hereto, the touch control unit causes switching between an activated protection session and a deactivated protection session for the touch inputs in the touch-sensitive input unit. The protection of the touch input during the active protection session can be effected in the input unit by means of an algorithm for encryption and/or signing (e.g. attaching an encrypted hash value of the touch input). Therein, an encryption protects from reading along and preferably also from manipulation; signing at least from an unrecognizable manipulation. Therein, a "session key", thus a key derived specific to session, can underlying a protection session or a general key valid for all of the protection sessions can be used. A key derived specific to session is a key, which is newly generated for each protection run according to a preset scheme.

For requesting an activation of the protection session, a respective application sends an activation message as a request to the touch control unit. Then, a protection of the touch input for the respective application can be switched on (application is in the foreground) or switched off (application not in the foreground) by the touch control unit as needed. The protection by the protection session can provide that the touch data of the touch input is encrypted and/or supplemented with a signature. In addition, the touch control unit can decide based on an additional criterion when the protection session is to be switched on or switched off, which is explained later. Based on the activation message, the touch control unit can thus recognize if an application currently wishes to obtain confidential information from the user and therefore receives touch inputs to be protected. The touch control unit can be provided as a software program.

By the touch control unit, it is decided when the protection session for the respective application is to be activated. It is switched to a protection session for an application if the touch control unit has received the said activation message from the respective application and a message of the composition circuit confirms that the graphical user interface of the respective application is displayed in the foreground on the display (thus on the touch-sensitive input unit or the separate display). In other words, the touch input can be encrypted and/or signed if it is determined by the touch control unit that a respective application is in the foreground on the touch-sensitive input unit and the respective application at least temporarily requests an encryption before or while it is in the foreground because the next touch input to be expected is indications to be protected.

By the present disclosure, the advantage arises that a touch input on a touch-sensitive input unit can be encrypted and/or signed depending on a predetermined criterion and this protection session nevertheless can again be deactivated by the touch control unit if there is no need of the encryption such that the touch-sensitive input unit can also be provided to other applications, which cannot deal with the encryption and/or signature. For the encryption, a corresponding circuit can be provided in the input unit, which can be activated and deactivated by the touch control unit e.g. via the bus connection. The decryption of an encrypted touch input and/or the verification of a signature can be effected in the touch control unit before it forwards the decrypted and/or verified touch input to the respective application.

The present disclosure also includes embodiments, by which additional advantages arise.

In an embodiment, the touch-sensitive input unit represents a touchpad and/or a touch display, on which the touch input is received. Thus, the touch-sensitive input unit can be a separate touchpad, which can be coupled to a display or screen. The touch-sensitive input unit itself can be a display with an integrated touch functionality or touch input functionality, thus a so-called touchscreen.

In an embodiment, the user interface of the respective application is displayed in the said graphical foreground all alone or alternatively thereto only partially, namely together with other applications. In other words, one or more than one application can be displayed on the touch-sensitive input unit at the same time. More than one application can be displayed by partially superimposing the user interfaces. If the protection session has been requested by one of these applications, which are a constituent of the foreground, thus, the touch inputs are encrypted and/or signed for the entire display surface, thus for all of the coordinates or touch sites.

If an application sends an activation message to the touch control unit, according to an embodiment, the protection session is activated and an access token for authentication is handed or provided to the respective application. In other words, the respective application can be provided with an identification. Hereby, the advantage arises that it can be ensured based on a pre-known access token of the applications that only this application and no other application (e.g. malware) can again deactivate the protection session. It can additionally be provided that the access token is provided to at least one further predetermined application in order that it is also authorized for deactivating the protection session. Additionally or alternatively to an access token, it can be resorted to another authorization method. Switching back to the deactivated protection session is initiated by the respective application and/or by another application if it sends a deactivation message as a request for deactivation of the protection session and authorizes itself according to the authorization method, in particular in that it proves the access token. Thus, it is controlled by the authorization method, which application can terminate an active protection session.

In an embodiment, during the active protection session for an application, the touch control unit examines an execution state of the respective application, in particular by examining a presence of a cyclic confirmation of the respective application. The active protection session is switched off if the execution state of the respective application satisfies a predetermined switch-off criterion. The switch-off criterion can include that the cyclic confirmation is absent. Thus, the respective application has to repeatedly send the activation message or a confirmation message after a predetermined time interval to the touch control unit during the active protection session to confirm a continuous need of the protection session. If the confirmation lacks after the time interval or is not received at the touch control unit, it can be assumed that the application hangs and/or does not function and thus the protection session should be switched off. Hereby, the advantage arises that the touch inputs become again readable for other applications if the requesting application hangs. The duration of the predetermined time interval can for example be in a range from ten milliseconds up to one minute or more. Thereto, the respective application can request the touch control unit based on a deactivation message to terminate the active protection session. The deactivation message can be generated if the respective application does no longer need a protection (e.g. at the end of a PIN input) and/or if it is closed/terminated and/or if a secret or confidential touch input does not have to be further transferred to the respective application. This means, the respective application itself decides, e.g. depending on a current user action, if the protection is further required. The user action can for example be logging into an email account. Hereby, the advantage arises that it can be communicated to the touch control unit by the respective application if a need of the active protection session is present and/or the active protection session is to be switched off. Thus, the application can minimize the time, in which the protection session is activated.

In an embodiment, it is provided that if a predetermined other application, to which a protection prohibition is present (e.g. reversing camera), and/or one of the other applications, to which a request for a protection session is not present, is displayed in the foreground, the active protection session is switched off by the touch control unit. In other words, the active protection session can be switched off if the touch control unit recognizes that the display is occupied by an application without encryption demand or with encryption prohibition. The predetermined other application can also have priority with respect to the respective application and therefore be displayed in the foreground upon its activation without assistance by the user. An example for an application with protection prohibition is a video stream of a reversing camera. The advantage arises that a display hierarchy of the applications in the foreground can be controlled based on a predetermined type and/or priorities and/or subordinations of the applications and the deactivation of a protection session is automatically effected if a hierarchically higher application without protection demand is automatically brought into the foreground due to its hierarchical level. This overall results in a so-called Z-order, wherein Z indicates the superposition positions of the user interfaces. The predetermined other application can for example represent the reversing camera and/or a pop-up window for an emergency situation and/or an error message. The automatic deactivation of the encryption can now also be forced for them.

In an embodiment, it is provided that if the active protection session is switched off, it is signaled to the respective application and/or to a user of the respective application by the touch control unit that the protection session is deactivated. For signaling, a message is sent to the respective application and/or a warning message is displayed to the user on the display and/or an acoustic audio output is output.

In an embodiment, the applications are divided into functional groups. For example, all of the applications, which run on a common virtual machine, can be associated with a functional group. Each functional group generally describes applications, which are identical at least in type and/or function and/or execution system. A respective virtual machine can have its own individual operating system, on which the applications can be executed. The operating system can for example be an Android operating System®.

Within the functional group, the user interfaces of the applications can be combined or managed by a group-owned composition unit, e.g. by a composition software of the operating system, e.g. the so-called window manager. Thus, a ready display content already comes from a functional group, which considers the user interfaces of all of the applications of the functional group. The (global) composition circuit described heretofore then requires only this result of this group-owned composition from the functional group to superimpose it in turn on the user interfaces of applications extraneous to group or on the composition from another functional group to ascertain the final display foreground.

In order to also manage the encryption for a functional group, the applications of a respective functional group, which each send the activation message to the touch control unit, are associated with a common display layer. The common layer is considered as an individual application with respect to the activation and/or deactivation of the protection session. For example, the common layer can have a single Z-value in a Z-order of the display hierarchy. In other words, the applications, which are associated with a respective common virtual machine, can share an individual or common protection session if they have sent the activation message to the touch control unit. Alternatively or additionally, the protection session can remain active until the demand of the protection session for each of the applications is terminated or covered, which are executed on a respective virtual machine and had requested a protection session.

The functional groups can for example be realized as software partitions, which can be operated on a respective virtual machine. A software partition can for example contain in-vehicle infotainment (IVI) applications and a software partition can contain the system applications. The IVI applications can for example deal with navigation and/or radio and/or media and/or telephone and/or Internet surfing. The system applications can deal with air conditioning and/or start-up animation and/or system pop-up messages to the vehicle state.

In an embodiment, a counter for the touch control unit is provided, which counts a current number of the valid activation messages of the applications belonging to the respective layer. The counter describes a positive number of the number of the activation messages, which are still valid and/or have not yet been cancelled by a deactivation message. The protection session is activated as long as the respective layer is displayed in the foreground and the current number of the activation messages is additionally greater than 0. In other words, the number of the activation messages in the counter changes if an activation message and/or a deactivation message are received at the touch control unit and/or the described cyclic confirmation is absent. The counter can be a program code or a logic circuit, which can comprise at least one clock input signal and at least one output signal. The counter can then be coupled to the touch control unit or be integrated in it. The counter can perform the increment and/or decrement depending on an input signal.

In an embodiment, the active protection session of the respective layer is switched off and the counter is reset to 0 if an application of another functional group is displayed in the foreground by the composition circuit. In other words, the protection session can remain activated as long as the respective layer is displayed in the foreground (and the counter value is greater than 0). However, the protection session for the respective layer can be switched off if the respective layer in the foreground is overlaid by a predetermined application, which does not require a protection session. The predetermined other application can be executed on another virtual machine or be given e.g. by an external control device, e.g. by a reversing camera.

An embodiment includes that the protection of the touch input is effected in the input unit by means of an algorithm for encryption and/or signing in the protection session as it was already described.

An embodiment includes that the input unit includes multiple displays, and in case that the user interface of an application with an active protection session is moved from a first one to a second one of the displays, the protection session is deactivated for the first display and activated for the second display. Thus, the protection session follows the user interface.

An embodiment includes that a predetermined control device, which is different from the computer system and which is also coupled to the input unit, is authorized to terminate a protection session. The control device is in particular a constituent of a reversing camera such that in case that a video stream of a reversing camera is displayed (reverse gear engaged), a protection session for the video stream is not active.

An operating device for the motor vehicle also belongs to the present disclosure. The operating device includes at least one touch-sensitive input unit and a computer system with a touch control unit and a composition circuit. The input unit can be coupled to the computer system via the described bus connection or generally the described communication link. The touch control unit comprises a data input for receiving messages from the composition circuit and/or from applications and a data output for controlling the touch-sensitive input unit. The computer system can comprise a processor device, which is configured to perform embodiments of the method according to the present disclosure. Hereto, the processor device can comprise at least one microprocessor and/or at least one microcontroller and/or at least one FPGA (Field Programmable Gate Array) and/or at least one DSP (Digital Signal Processor).

The also provided motor vehicle according to the present disclosure is preferably configured as a car, in particular as a passenger car or truck, or as a passenger bus or motorcycle.

The present disclosure also includes the combinations of the features of the described embodiments. Thus, the present disclosure also includes realizations, which each comprise a combination of the features of multiple of the described embodiments if the embodiments have not been described as mutually exclusive.

In the following, embodiments of the present disclosure are described.

The embodiments explained in the following are preferred embodiments. In the embodiments, the described components of the embodiments each represent individual features of the present disclosure to be considered independently of each other, which also each develop the present disclosure independently of each other. Therefore, the disclosure also is to include combinations of the features of the embodiments different from the illustrated ones. Furthermore, the described embodiments can also be supplemented by further ones of the already described features of the present disclosure.

In the figures, identical reference characters each denote functionally identical elements.

FIG. 1 illustrates a motor vehicle 10, in which an operating device 20 is arranged. For example, the motor vehicle 10 can be a car, in particular a passenger car or a passenger bus or a truck. The operating device 20 can be a constituent of a cockpit/infotainment system CIS (information entertainment system). It includes a touch-sensitive input unit 30, which can be formed in the form of a touchscreen. Alternatively, the touch-sensitive input unit 30 can be a touchpad, with which a separate monitor or head-up display can be associated. The touch-sensitive input unit 30 can comprise a sensor pad for capturing touch and/or swipe gestures in a manner known per se. There can be multiple such touch-sensitive input units 30 in the operating device 20. The touch-sensitive input unit 30 can be connected to a computer system 40 via a bus connection 90. Via the bus connection 90, the touch-sensitive input unit 30 can communicate with a touch control unit 80 and/or a composition circuit 70 of the computer system 40. The bus connection 90 can be a CAN bus connection 90.

Via the bus connection 90 or a display connection 91, pixel data 92 for a display control on the input unit 30 (or the separate display) can be output. Alternatively thereto, the communication can be integrated in the display connection 91 instead of the separate bus connection.

The computer system 40 can comprise a processor circuit CPU with at least one microprocessor. The composition circuit 70 and/or the touch control unit 80 can each for example be based on a microcontroller and/or an embedded system and/or an application-specific integrated circuit and/or a software for the processor circuit CPU.

In the computer system 40, applications APPs can be operated to provide functionalities of the operating device 20, in particular of the cockpit/infotainment system CIS. The applications can be controlled by means of a touch input 31, which can be input on the touch-sensitive input unit 30 by a user 32 e.g. with a finger 33 and/or an object. The touch input 31 can be described by the touch coordinates X, Y on the touch-sensitive input unit 30.

The input unit 30 can send touch data 34 with the touch coordinates X, Y via the bus connection 90 to the touch control unit 80 or (as illustrated in FIG. 1) to a receiving module 81, which can forward or signal the touch coordinates X, Y to that application, the graphical user interface of which is currently displayed on the input unit 30 or the separate display at that location, which corresponds to the touch coordinates X, Y.

The applications can be divided into functional groups 50, 60. Here, only two functional groups 50, 60 are for example illustrated. Each functional group 50, 60 includes one or some of the applications, which can have at least one common function. The common function can for example be entertainment for the user and/or a control function. Each functional group 50, 60 can be executed on a virtual machine in order that the applications of the same functional group 50, 60 can be executed by a single virtual machine. Such a virtual machine can for example execute an Android operating System® to execute the applications of a functional group 50, 60.

The touch input of the user can be a password and/or PIN inputs for an access to a respective application for various functions, e.g. payments and/or email.

The composition circuit 70 can generate the respective graphical user interface of the applications on the touch-sensitive input unit 30 or the separate display before and/or in the meantime. That is, the applications can be displayed opened or ready for input by the composition circuit 70. In order to control and/or access a respective application of a respective functional group 50, the user 32 can be requested to input the touch input 31 on the touch-sensitive input unit 30. It can be provided that a certain function of an application can only be displayed opened if the touch input matches with a predefined authentication. The predefined authentication can for example describe a password and/or a user name and/or login indications. The corresponding user input 31 is then to be protected upon the transfer from the input unit 30 to the receiving module 81.

Because it can be provided that an aftermarket appliance 100, which is not a constituent of an equipment by the manufacturer, is also connected to the bus connection 90 like the computer system 40 such that it could there read and/or even manipulate the touch data 34 with the touch input 31. Therefore, the touch input 31 can be encrypted by the input unit 30 (in FIG. 1 symbolized by hatching) and then be decrypted by the touch control unit 80 or the receiving module 81 before it is forwarded to one of the applications. Additionally or alternatively, a signature of the touch input 31 can be effected. For activating the encryption and/or signing, a protection session 34 can be activated by the touch control unit 80 in the input unit 30 by means of a predetermined activation signal 82. The protection session 34 can be performed by a cryptographic circuit module 35 of the input unit 30. By means of a deactivation signal 83, the touch control unit 80 can again deactivate the protection session 34 in the input unit 30. If a receiving module 81 is provided, a decryption and/or signature verification can be correspondingly activated by means of an activation signal 82 and deactivated by means of a deactivation signal 83 therein. In the following, it is exemplarily assumed that an encryption is effected.

In order to decide, in which time window the protection session 34 is to be active, the touch control unit 80 in the computer system 40 can communicate with the applications and the composition circuit 70. If a respective application from one of the functional groups 50, 60 requires encryption for the touch input (can be set by the manufacturer of the application), this application can send a request to the touch control unit 80 by means of an activation message 84.

For activating the protection session 34, it is additionally examined by the touch control unit 80 if the user interface of the respective application is currently displayed in the foreground on the display by the composition circuit 70. Hereto, the touch control unit 80 can receive corresponding data or messages 71 of the composition circuit 70.

For such time windows, in which an application is displayed in the foreground, which has sent an activation message 84 for requesting a protection session, the protection session is activated by the touch control unit 80 in the input unit 30. If an application is not displayed in the foreground, which has sent and/or cyclically confirmed a request for a protection session 34, thus, the protection session is deactivated by the touch control unit 80.

Figure 2:
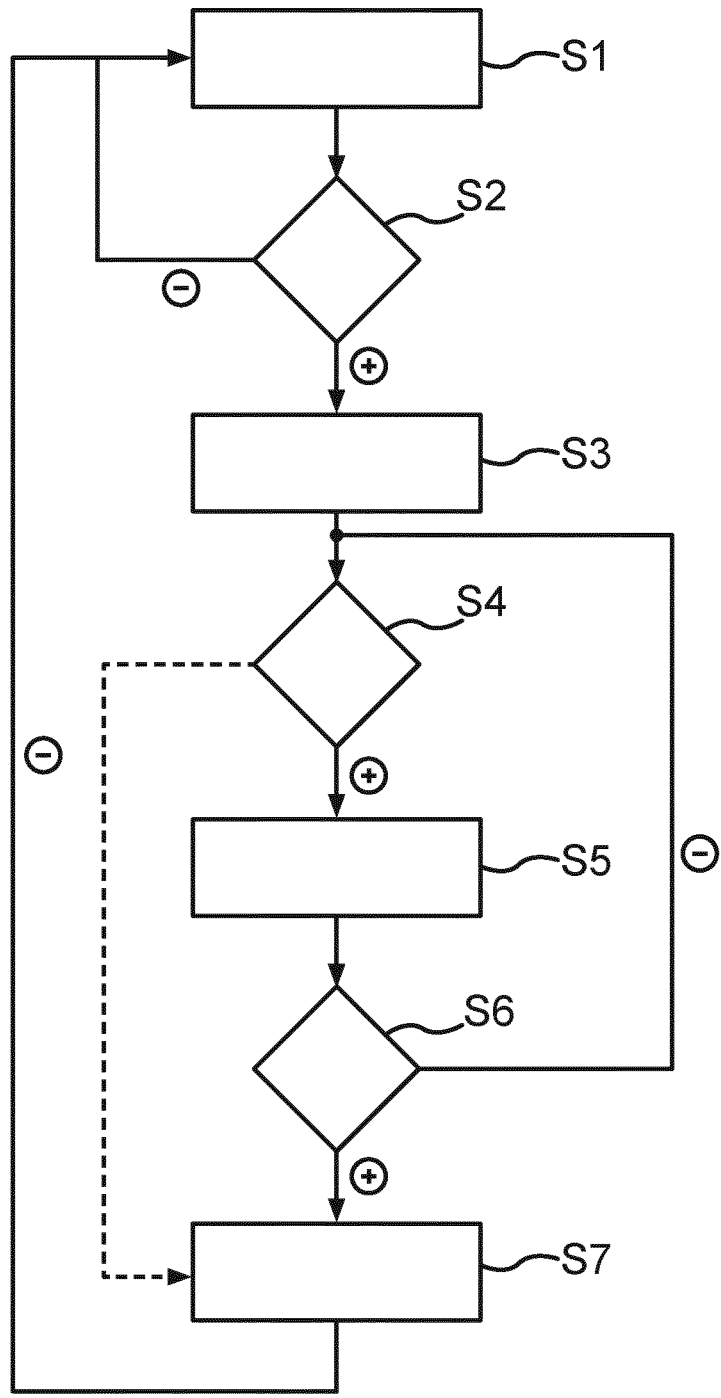
FIG. 2 illustrates a flowchart of basic steps of the method according to the present disclosure.

FIG. 2 illustrates a possible flowchart of the method steps of the corresponding method, wherein the order of some method steps can also be changed without the function of the method changing.

In a first step S1, the touch control unit 80 can receive the messages 71 from the composition circuit 70, which signal, which application or which applications are currently displayed in the foreground on the display of the input unit 30 or of the separate display. In a step S2, the touch control unit 80 can examine if one of these applications currently displayed in the foreground has sent an activation message 84, If this is not the case (in FIG. 2 symbolized by a minus sign "−"), thus, it can be returned to step S1 and new, updated messages 71 can be evaluated to recognize a change of the foreground.

In contrast, if it is recognized in step S2 that at least one application displayed in the foreground has sent and/or confirmed an activation message 84 (plus sign "+"), thus, the protection session 34 can be activated in a step S3 by the touch control unit 80 of the input unit 30 (and optionally the receiving module 81) by means of the activation signal 82. Only with activated protection session 34, the touch data 34 of the touch inputs 31 is encrypted (and/or signed) by the input unit 30, before it is transmitted to the computer system 40.

In a step S4, it can be examined if the activation message 84 is cyclically confirmed by the application (in that it is for example cyclically newly sent). If this is not the case (minus sign "−"), thus, it can be jumped to a step S7. This is an example for an authorization method.

In contrast, if the confirmation is the case (plus sign "+"), thus, the protection session 34 can be maintained in a step S5, thus, while a display of the graphical user interface of the application is further effected, of each captured user input 31 the touch data 34 of which is transferred in encrypted manner e.g. via the bus connection 90.

Herein, it can be examined in a step S6 if a dominant application or application superordinated in a Z-order, which does not require encryption or for which an encryption must not be provided, is superimposed in the foreground in the meantime (recognizable by updated messages 71). If this is the case (plus symbol "+"), thus, it can be changed to step S7. Otherwise (minus symbol "−"), it can be continued with step S4.

In step S7, the activation message 83 is transmitted by the touch control unit 80 for deactivating the protection session 34.

Then, it can be continued with step S1 to capture or recognize a change of the display in the foreground.

In the following table, a state control for the protection session 34 is illustrated:

| Activation message obtained from application | GUI of the application over-laid on display | Protection session |
|---|---|---|
| yes | no | on |
| yes | yes | off |
| no | no | off |
| no | yes | off |

Figure 3:
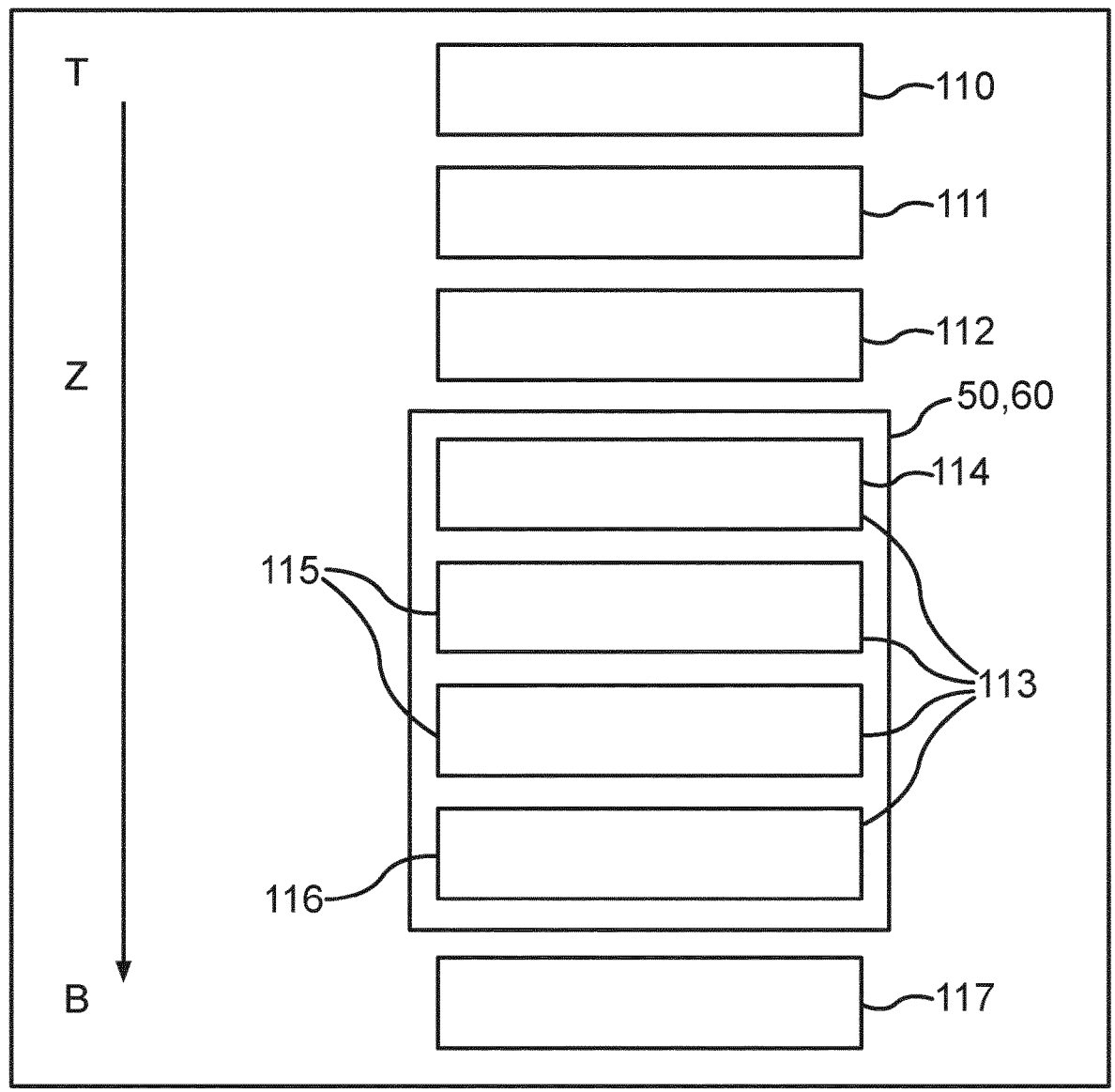
FIG. 3 illustrates a superposition of user interfaces of multiple applications.

In FIG. 3, it is illustrated how the described hierarchy or Z-order can be realized. The Z-order can reach from a highest hierarchical level T (top) up to a lowest hierarchical level B (bottom). In a display, in which the user interface of only a single application is presented at the moment, it results by the Z-order, which application overlays the user interface of which application in the foreground if it is active. Therein, the hierarchical level T is the most dominant. If multiple user interfaces can also be simultaneously displayed by only partial superposition, thus, the superposition can be individually decided or determined for different image regions according to the Z-order. The Z-order can be programmatically set in advance.

It is illustrated how high-priority pop-up windows 110 for system messages (e.g. a warning message) can take the highest hierarchical level T, then for example the user interface 111 of a parking assistant of the motor vehicle 10, for example a reversing camera. An application 112 can be arranged below in theZ-order. Furthermore, it is illustrated how multiple applications 113 of a functional group 50, 60 can commonly take a single hierarchical level in the Z-order.

Within this respective functional group 50, 60, a group-owned composition unit with an in-group hierarchy for pop-ups 114, group-owned applications 115 and a graphical background 116 of the functional group can for example be provided. The lowest hierarchical level B can be taken by a global or general graphical background 117 or a global operating menu.

If multiple input units 30 with own display are provided, for example multiple touchscreens, thus, an individual protection session 34 can be switched for each thereof independently of each other input unit 30. By the messages 71 of the composition circuit, it can be signaled on which display currently which of the applications with its respective user interface is displayed. Additionally or alternatively thereto, it can be signaled by each application itself by the activation messages 84 and by deactivation messages, for which of the input units 30 the application currently requires the protection session 34. Thus, an application can correspondingly shift or "take along" the protection session 34 whenever its user interface, e.g. its so-called window, is shifted to another display in the meantime.

Overall, the examples show, how an adaptive dynamic encryption of a touch input can be provided.

The invention claimed is:

1. A method for operating a touch-sensitive input unit of an operating device for a motor vehicle, the method comprising:
controlling, by a touch input via the touch-sensitive input unit, an application on a computer system of the motor vehicle, wherein the touch input is input by a user on the touch-sensitive input unit;
displaying, by a composition circuit in the computer system, a graphical user interface of the application on the touch-sensitive input unit or a separate display;
sending, by the application, a request to the touch control unit, the request including an activation message for activation of a protection session;
activating, by the touch control unit, the protection session for the application, the activating being based on a confirmation from a message of the composition circuit that the graphical user interface of the application is displayed in a foreground on the touch-sensitive input unit or the separate display; and
communicating, by the touch control unit, the touch input from the touch-sensitive input unit with the application and/or the composition circuit, using the protection session,
wherein the application is one of a plurality of applications, the plurality of applications being part of a functional group, the functional group running on a respective virtual machine,
wherein a common layer is associated with the plurality of applications in the functional group,
wherein each of the plurality of applications sends a respective activation message to the touch control unit, the method further comprising sharing, by the plurality of applications, the protection session,
wherein a counter is provided in the touch control unit for counting a current number of the respective activation messages of the plurality of applications belonging to the common layer, and
wherein the counter describes at least one of a positive number or an increment or decrement of the number of the activation messages, wherein the method further comprises:

in response to a respective layer being displayed in the foreground and the current number of the activation messages being greater than zero, activating the protection session.

2. The method according to claim 1, wherein the application is completely or partially displayed in the foreground on the touch-sensitive input unit.

3. The method according to claim 1, further comprising:
based on the activating the protection session, authorizing the application according to a predetermined authorization method, the predetermined authorization method including providing an access token;
sending, by the application and/or by another application, a second request to the touch control unit, the second request including a deactivation message for deactivation of the protection session; and
in response to sending the deactivation message to the touch control unit and the providing the access token, deactivating the protection session by the application and/or by another application.

4. The method according to claim 1, further comprising:
while the protection session is active for the application, examining, by the touch control unit, an execution state of the application, the execution state comprising a presence of a cyclic confirmation of the application; and
in response to the execution state of the application satisfying a predetermined switch-off criterion, deactivating the protection session, wherein the execution state is an absence of the cyclic confirmation.

5. The method according to claim 1, further comprising:
in response to at least one of presenting of a protection prohibition for a predetermined other application, or displaying by another application in the foreground on the touch-sensitive input unit by the composition circuit, a request for a protection session not being present from the other applications, deactivating, by the touch control unit, the protection session for the application.

6. The method according to claim 5, further comprising:
in response to deactivating the protection session, signaling, by the touch control unit, to the application and/or to a user of the application, that the protection session is deactivated,
wherein the signaling comprises at least one of sending a message to the application, outputting a warning message to the user on the touch-sensitive input unit or the display, or outputting an acoustic audio output.

7. The method according claims 1, further comprising:
in response to a further application of another functional group being displayed on the touch-sensitive input unit by the composition circuit,
deactivating the active protection session of the common layer; and
resetting the counter to zero.

8. The method according to claim 1, the activating the protection session comprising:
effecting, by an algorithm, protection of the touch input in the touch-sensitive input unit, for an encryption and/or signing in the protection session.

9. The method according to claim 1,
wherein the touch-sensitive input unit comprises a first display and a second display, the method further comprising:
in response to an application with an active protection session being moved from the first display to the second display, deactivating the protection session for the first display; and activating the protection session for the second display.

10. The method according to claim 1, wherein a predetermined control device is authorized to terminate the protection session, and wherein the predetermined control device is coupled to the touch-sensitive input unit.

11. An operating device comprising:
a touch-sensitive input unit;
a touch control unit comprising a data input for receiving messages and a data output for controlling the touch-sensitive input unit;
a computer system; and
a composition circuit,
wherein the operating device is configured to:
control, by a touch input via the touch-sensitive input unit, an application on a computer system of the motor vehicle, wherein the touch input is input by a user on the touch-sensitive input unit;
display, by a composition circuit in the computer system, a graphical user interface for the application on the touch-sensitive input unit or a separate display;
send, by the application, a request to the touch control unit including an activation message for activation of a protection session;
activate, by the touch control unit, the protection session for the application, the activating being based on the touch control unit receiving the activation message from the application, and based on a confirmation from a message of the composition circuit that the graphical user interface of the respective application is displayed in a foreground on the touch-sensitive input unit or the separate display; and
communicate, by the touch control unit, the touch input from the touch- sensitive input unit with the application and/or the composition circuit, using the protection session,
wherein the application is one of a plurality of applications, the plurality of applications being part of a functional group, the functional group running on a respective virtual machine,
wherein a common layer is associated with the plurality of applications in the functional group,
wherein each of the plurality of applications sends a respective activation message to the touch control unit, wherein the operating device is further configured to share, by the plurality of applications, the protection session,
wherein a counter is provided in the touch control unit for counting a current number of the respective activation messages of the plurality of applications belonging to the common layer, and
wherein the counter describes at least one of a positive number or an increment or decrement of the number of the activation messages, wherein the operating device is further configured to:
in response to a respective layer being displayed in the foreground and the current number of the activation messages being greater than zero, activate the protection session.

12. A motor vehicle comprising an operating device, the operating device comprising:
a touch-sensitive input unit configured for inputting a touch input and/or for displaying the touch input;
a touch control unit configured to receive messages and/or control the touch-sensitive input unit;
a computer system; and
a composition circuit configured to generate a graphical user interface of an application on the touch-sensitive input unit or a separate display,
wherein the operating device is configured to:
control, by the touch input via the touch-sensitive input unit, an application on the computer system of the motor vehicle, wherein the touch input is input by a user on the touch-sensitive input unit;
display, by a composition circuit in the computer system, a graphical user interface for the application on the touch-sensitive input unit or a separate display;
send, by the application, a request to the touch control unit including an activation message for activation of a protection session;
activate, by the touch control unit, the protection session for the application, the activating being based on the touch control unit receiving the activation message from the application, and based on a confirmation from a message of the composition circuit that the graphical user interface of the respective application is displayed in a foreground on the touch-sensitive input unit or the separate display; and
communicate, by the touch control unit, the touch input from the touch-sensitive input unit with the application and/or the composition circuit, using the protection session,
wherein the application is one of a plurality of applications, the plurality of applications being part of a functional group, the functional group running on a respective virtual machine,
wherein a common layer is associated with the plurality of applications in the functional group,
wherein each of the plurality of applications sends a respective activation message to the touch control unit, wherein the operating device is further configured to share, by the plurality of applications, the protection session,
wherein a counter is provided in the touch control unit for counting a current number of the respective activation messages of the plurality of applications belonging to the common layer, and
wherein the counter describes at least one of a positive number or an increment or decrement of the number of the activation messages, wherein the operating device is further configured to:
in response to a respective layer being displayed in the foreground and the current number of the activation messages being greater than zero, activate the protection session.

* * * * *